United States Patent
Jones, III et al.

(10) Patent No.: US 7,235,898 B1
(45) Date of Patent: Jun. 26, 2007

(54) VEHICLE POWER DISTRIBUTION NODE WITH REDUNDANT POWER SUPPLY

(75) Inventors: James L. Jones, III, Belleville, MI (US); Kenneth J. Russel, Westland, MI (US); Alex Shoshiev, Beverly Hills, MI (US); Yongmin Sheng, Novi, MI (US)

(73) Assignee: Yazaki North America, Inc., Canton, MI (US)

( * ) Notice: Subject to any disclaimer, the term of this patent is extended or adjusted under 35 U.S.C. 154(b) by 392 days.

(21) Appl. No.: 10/692,331

(22) Filed: Oct. 23, 2003

(51) Int. Cl.
*B60L 1/00* (2006.01)

(52) U.S. Cl. .......................... 307/9.1; 307/29; 307/85; 361/62

(58) Field of Classification Search .................. 307/18, 307/19, 29, 85, 9.1, 10.1; 361/62, 65, 18
See application file for complete search history.

(56) References Cited

U.S. PATENT DOCUMENTS

| | | | |
|---|---|---|---|
| 4,757,249 A * | 7/1988 | Farber et al. ................ | 320/126 |
| 4,952,827 A | 8/1990 | Leipold et al. | |
| 5,175,484 A | 12/1992 | Witehira et al. | |
| 5,488,283 A * | 1/1996 | Dougherty et al. ......... | 307/10.1 |
| 5,654,859 A * | 8/1997 | Shi ............................. | 361/66 |
| 5,675,189 A | 10/1997 | Anma et al. | |
| 5,818,673 A | 10/1998 | Matsumaru et al. | |
| 5,856,711 A * | 1/1999 | Kato et al. .................. | 307/10.6 |
| 6,127,741 A | 10/2000 | Matsuda et al. | |
| 6,607,251 B2 * | 8/2003 | Baumgartner et al. ......... | 303/20 |
| 6,737,762 B2 * | 5/2004 | Koenig ......................... | 307/48 |
| 2001/0024064 A1 * | 9/2001 | Masaoka ..................... | 307/10.8 |
| 2003/0030322 A1 * | 2/2003 | Yokoyama et al. ..... | 303/122.04 |
| 2003/0062773 A1 * | 4/2003 | Richter et al. ............. | 307/10.1 |
| 2004/0124709 A1 * | 7/2004 | Eisenberger et al. .......... | 307/29 |
| 2005/0029867 A1 * | 2/2005 | Wood ......................... | 307/10.1 |
| 2005/0035656 A1 * | 2/2005 | Kuramochi et al. ........ | 307/10.1 |

FOREIGN PATENT DOCUMENTS

| | | | |
|---|---|---|---|
| JP | 08275408 A | * | 10/1996 |
| JP | 09046928 A | * | 2/1997 |
| JP | 09074669 A | * | 3/1997 |

* cited by examiner

*Primary Examiner*—Chau N. Nguyen
*Assistant Examiner*—Daniel Cavallari
(74) *Attorney, Agent, or Firm*—Rader, Fishman & Grauer PLLC

(57) ABSTRACT

A system and method for providing power redundancy to certain devices of a vehicle that are typically controlled by means of a power distribution and control node. Power is delivered to the node by both a primary power feed as well as a secondary power feed. Provided in each node is a first set of power relays for selectively providing power to at least one device of a first class, as well as a second set of power relays for selectively providing power to at least one device of a second class. Under a normal operating state of the node, the one or more first class devices, as well as the one or more second class devices, selectively receive power from the primary power feed. Upon the occurrence of a disruption in the primary power feed, the one or more second class devices will continue to operate by being selectively powered through the second set of power relays by the second power feed.

3 Claims, 3 Drawing Sheets

VEHICLE POWER DISTRIBUTION NODE WITH REDUNDANT POWER SUPPLY

FIELD OF THE INVENTION

The present invention relates to a system and method for distributing power to a plurality of vehicle devices, and more specifically, a system and method for distributing power so that certain vehicle devices continue to operate even after the primary pathway by which power is delivered becomes disrupted.

BACKGROUND OF THE INVENTION

Vehicle electrical systems have evolved over the years from the simplest level, involving a battery and lights, to a more complex level in which the typical passenger vehicle includes a battery, a power distribution center, and an extensive array and assortment of load devices ranging from engine controls, exterior and interior lights, entertainment systems, heating and air-conditioning systems, and many other electronic devices. Often the architecture of the vehicle power distribution and control system is configured to arrange the various load devices, such as those listed above, in groups and control such devices by modules or nodes that are strategically placed in each of several vehicle regions. For example, a modular-based automotive power distribution scheme is disclosed in U.S. patent application Ser. No. 10/055,563 entitled SCALABLE, MODULAR ARCHITECTURE FOR AUTOMOTIVE POWER DISTRIBUTION AND BODY CONTROL FUNCTIONS, filed on Jan. 23, 2002 and assigned to the same assignee as the present invention. Illustrated in FIG. 1 is one such example of a vehicle power distribution system where a vehicle 10 includes one or more power sources 22, such as a battery and alternator, delivering power to a power distribution center 20. Power is then distributed from the power distribution center 20 to various distribution and control nodes, such as, for example, a front passenger node 30, front driver side node 32, left and right body nodes 34 and 36, and a rear node 38. As depicted in FIG. 1, each node connects not only to a power distribution network 60, but also to a control area network 50 that allows one or more vehicle systems to communicate control signals to each node. In this manner, each node can be instructed on how to control the associated group of load devices controlled by that specific node, such as, for example, the group of load devices 42 associated with the front passenger node 30.

Due to various reasons, such as, for example, physical damage, faulty wiring or a faulty connection, it is possible that an unforeseeable power loss can occur to one or more of the power distribution and control nodes of a vehicle, thereby disabling all the load devices associated with the effected nodes. Disablement of certain devices, such as interior lights, radio, locks, and the like (collectively referred to as "class A and B devices"), do not needlessly jeopardize the safe operation of the vehicle. However, devices such as head lights, brake lights, windshield wipers and the like (collectively referred to as "class C devices") carry out critical functions that contribute to the safe operation of the vehicle. Accordingly, it is desirable that these class C devices remain in operation even after the occurrence of a power fault. Therefore, the inventors of the present invention have recognized the need for a new system and method for distributing power to vehicle devices, via one or more control nodes, that assures power redundancy to certain devices considered critical to the safe operation of the vehicle.

SUMMARY OF THE INVENTION

A system and method for providing power redundancy to certain devices of a vehicle that are typically controlled by means of a power distribution and control node. Power is delivered to the node by both a primary power feed as well as a secondary power feed. Provided in each node is a first set of power relays for selectively providing power to at least one device of a first class, as well as a second set of power relays for selectively providing power to at least one device of a second class. Under a normal operating state of the node, the one or more first class devices, as well as the one or more second class devices, selectively receive power from the primary power feed. Upon the occurrence of a disruption in the primary power feed, the one or more second class devices will continue to operate by being selectively powered through the second set of power relays by the second power feed.

DETAILED DESCRIPTION

Figure 1:
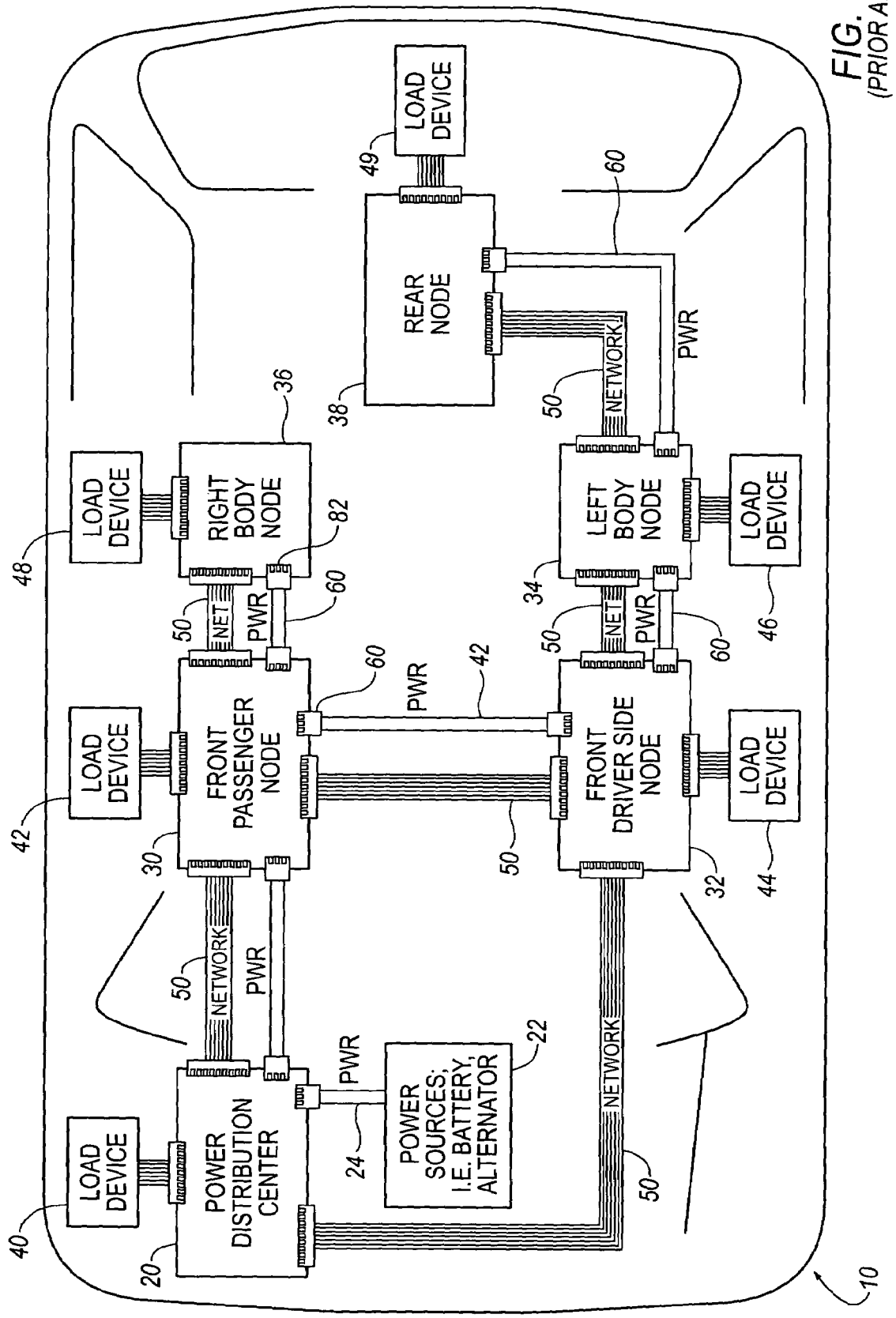
FIG. 1 illustrates a general power distribution scheme utilized in a vehicle.
Figure 2:
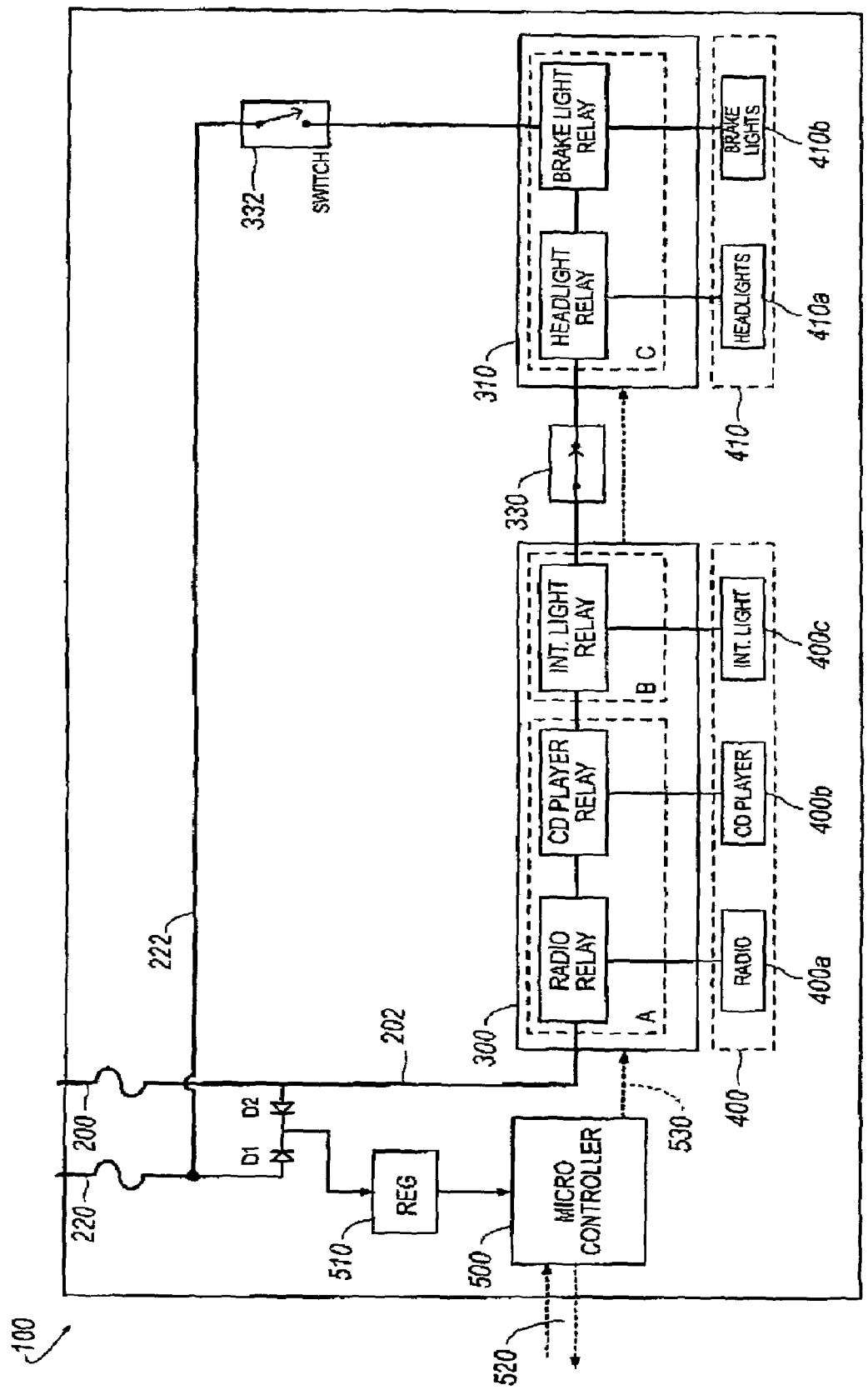
FIG. 2 is a basic schematic of a power distribution node according to one embodiment of the invention.

One embodiment of the present invention will now be described with reference to the Figures. Illustrated in FIG. 2 is a power distribution and control module or node 100 according to a first embodiment. Node 100 in FIG. 2 may be used as any one or more of nodes 30, 32, 34, 36, or 38, for example, in FIG. 1. As depicted in FIG. 2, node 100 receives electrical power through two separate pathways, including a primary power feed 200 and a secondary power feed 220. Both primary power feed 200 and secondary power feed 220 are delivery pathways that transport power generated by the vehicle's power sources, such as a battery and an alternator (See FIG. 1), to one or more power distribution and control nodes 100. Similar to the power distribution scheme of FIG. 1, primary power feed 200 and secondary power feed 220 of the present embodiment can receive power indirectly from one or more vehicle power sources through, for example, a power distribution center 20 (see FIG. 1). According to the illustrated embodiment, both primary power feed 200 and secondary power feed 220 receive power from the same vehicle power sources. Fuses protecting the power feeds are shown within the node 100 for simplicity but are actually located adjacent to or within the power distribution center.

To control one or more types of vehicle devices, power distribution and control node 100 relies upon at least two sets of power relays or switches for selectively activating one or more vehicle load devices (LD). According to the embodiment illustrated in FIG. 2, node 100 includes two sets or groups of relays, including first relay set 300 and second relay set 310. The first set of power relays 300 are configured to control the flow of power to one or more load devices of a first type 400, while the second set of power relays 310 are configured to control the flow of power to one or more load devices of a second type 410.

According to the present embodiment, the first type of load devices 400, which are controlled by the first set of relays 300, comprise vehicle devices that are considered non-essential to the safe operation of the vehicle. Accordingly, these first types of devices 400, in terms of one standard automotive industry classification scheme, would be considered as carrying out either Class A or Class B type functions, such as, for instance, a vehicle radio, CD player, or vehicle interior lighting.

In contrast, the second types of load devices 410, which are controlled by the second set of relays 310, comprise vehicle devices considered important or essential to the safe operation of the vehicle. Accordingly, this second type of load device 410 is considered to include devices designed to carry out Class C type functions, such as, for example, headlights, brake lights and windshield wipers.

Control of each of the individual switches or relays residing in either the first set of relays 300 or the second set of relays 310 is the responsibility of microcontroller 500. Control signals issued by the microcontroller 500 travel over a communication link 530 to the two sets of relays 300 and 310. By means of the control signals, microcontroller 500 is able to place any one or more individual relays, residing in either set of relays, into an open or closed state, thereby controlling the various load devices 400 and 410.

Depending on the current operating state of the power distribution and control node 100, the first set of relays 300, second set of relays 310 and the microcontroller 500 are energized by power distributed from either a primary power feed 200 or a secondary power feed 220. Upon entering node 100, primary power feed 200 distributes power through circuit path 202 to the first set of power relays 300. Power from primary power feed 200 will also be distributed to the second set of relays 310 depending on the state of a switch 330 that connects the second set of relays 310 in series with the first set of relays 300. Node 100 is also configured so that power from primary power feed 200 can be utilized to energize the microcontroller 500. According to this configuration, power from the primary power feed 200 is diverted from circuit path 202 through a diode D2 and onto a power regulator 510. Regulator 510 is responsible for conditioning the power signal before passing the power on to energize microcontroller 500.

Upon entering the power distribution and control node 100, secondary power feed 220 distributes power along a second circuit path 222, which can be selectively configured by means of switch 332 to provide this power to the second set of relays 310. Similar to above, node 100 is also configured so that power from secondary power feed 220 can be utilized to energize microcontroller 500. According to this configuration, power from secondary power feed 220 is passed through diode D1, onto power regulator 510 and microcontroller 500.

Communication between the power distribution and control node 100 and other vehicle systems is maintained by the node's microcontroller 500, which is linked to a vehicle control area network (not depicted) by means of a communication interface 520. In this manner, a central processor or other type of control system of the vehicle (also not depicted) can query the current status of the node 100, as well as instruct the node 100, by means of microcontroller 500, to either activate or deactivate certain vehicle devices powered through the node 100.

Normal operation of the power distribution and control node 100 will now be described in accordance with one embodiment of the present invention. When node 100 is in a normal operating state, switch 330 is maintained in a closed state while switch 332 is maintained in an open state. Consequently, power from primary power feed 200 is delivered by circuit path 202 to the first set of relays 300, as well as through switch 330 to the second set of relays 310. One or more individual relays in either set of relays 300 and 310 can then be activated in response to one or more control signals generated by microcontroller 500 and delivered over communication link 530, thereby controlling the operation of any one or more of the load devices 400 and 410.

Depending on the specific configuration of diodes D1 and D2, node 100 can be configured so that during normal operations, the power required to energize microcontroller 500 is obtained from either the primary power feed 200 or the secondary power feed 220. Thus, according to one embodiment, the power relays are energized by power obtained from primary power feed 200, while the microcontroller 500 is energized by power received from secondary power feed 220. Alternatively, power from primary power feed 200 can be used to energize both sets of relays 300 and 310, as well as microcontroller 500.

The power redundancy features of the power distribution and control node 100 will now be discussed in accordance with two embodiments representing different types of power fault conditions. According to a first embodiment, a power fault occurs such that secondary power feed 220 is no longer able to provide power to node 100. This fault can represent any one of numerous conditions that ultimately results in secondary power feed 220 becoming either an open circuit, or conversely, short-circuited. In either situation, the end result is an inability of secondary power feed 220 to be able to provide power to node 100. First relay set 300 and second relay set 310 continue to receive power as node 100 is normally configured so that these relay sets derive power from primary power feed 200. If microcontroller 500 is similarly configured to receive power from primary power feed 200, then no disruption will occur in the operation of node 100. However, if microcontroller 500 is configured to normally receive power from secondary power feed 220, then the disruption of that power feed would normally result in the disablement of microcontroller 500, which, in turn, results in a loss of control of both sets of power relays. The present invention avoids the above-described situation by configuring node 100 so that power from primary power feed 200 will begin to be diverted through diode D2 and onto the microcontroller 500 after being conditioned by regulator 510. Diode D1 effectively isolates the primary power feed 200 from secondary power feed 220 so that if secondary power feed 220 is disrupted by a short-circuit, no power from the primary power feed 200 will be lost to the short-circuit.

According to a second embodiment, a power fault occurs such that primary power feed 200 is no longer able to provide power to node 100. If microcontroller 500 was being energized by power derived form the primary power feed 200, it will continue to operate by obtaining power from secondary power feed 220. Similar to before, diode D2 isolates secondary power feed 220 from primary power feed 200, thereby preventing any loss of power from occurring between the two power feeds if a short-circuit exists on the primary power feed 200.

In typical systems, a disruption of primary power feed 200 would result in the loss of control in all the load devices connected to and operated by the node in question. This situation can be especially dangerous when it occurs in a moving vehicle as it results in a loss of control over all the devices connected to and controlled by the node in question. The present invention minimizes the danger normally produced by such a condition by assuring that certain devices, such as those considered important for the safe operation of the vehicle, will continue to operate. Specifically, upon the occurrence of a fault in the primary power feed 200, switch 332, which is configured to open and close, respectively, in response to the absence or presence of a primary power feed fault, closes so as to reroute power from secondary power feed 220 to the second set of relays 310. This assures the continued operation of all the load devices 410 connected to the second set of relays 310.

Beyond assuring a source of power for the second set of relays 310 and their subsequent load devices 410, the system must also isolate the secondary power feed 220 from the primary power feed 200. Otherwise, the fault occurring in the primary power feed 200 may adversely affect the secondary power feed 220. For example, the presence of a short-circuit in the primary power feed 200 would also disrupt the secondary power feed 220 if the two power feeds were connected. Accordingly, while switch 332 is being closed so as to route power from the secondary power feed 220 to the second set of relays 310, switch 330 is being opened to assure that the secondary power feed 220 is isolated from the fault in the primary power feed 200.

Figure 3:
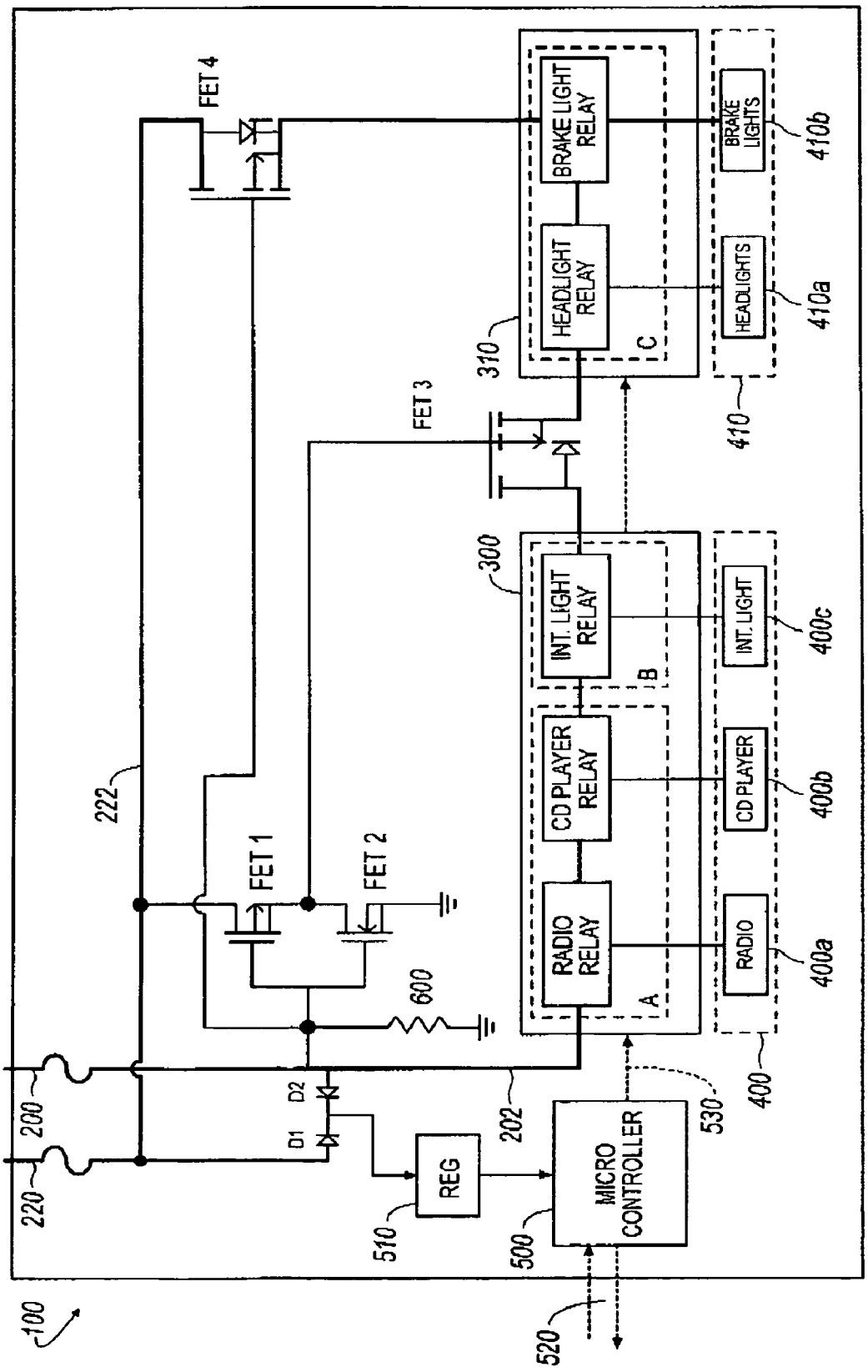
FIG. 3 is a more detailed schematic of a power distribution node according to another embodiment of the invention.

Switches 330 and 332 will now be discussed in greater detail with reference to FIG. 3, which is a schematic of a power distribution and control node 110 according to an additional embodiment of the present invention. According to this embodiment, switch 330 is comprised of three field-effect transistors FET 1, FET 2 and FET 3, while switch 332 comprises a single transistor FET 4.

FET 1 and FET 2 are configured in series, with the drain of FET 1 connecting to the secondary power feed 220 while the source of FET 2 is grounded. The gates of FET 1 and FET 2 are wired, in parallel, to circuit path 202, as well as to a resistance 600 that is grounded. As such, the voltage across resistance 600 will be applied to the gates of both FET 1 and FET 2.

FET 3 is configured between the first set of relays 300 and the second set of relays 310 so as to place them in series when FET 3 is on. As a result, as long as FET 3 is on, power derived from primary power feed 200 will be provided to both the first set of relays 300 and the second set of relays 310. However, if FET 3 is off, then the two sets of relays become isolated from one another. The on and off state of FET 3 is determined by its gate, which connects to the source of FET 1 and the drain of FET 2.

FET 1 and FET 3 are P-channel field-effect transistors, while FET 2 is an N-channel field-effect transistor. Consequently, FET 1 and FET 3 will turn off upon their gates being grounded, and turn on upon application of a sufficiently high enough voltage to their gates. FET 2, being an N-channel field-effect transistor, functions opposite to that of FET 1 and FET 3, turning off when its gate is grounded, and turning on when its gate receives a sufficiently high enough voltage.

FET 4 is configured to act as a switch between secondary power feed 220 and the second set of relays 310, with the gate of FET 3 connected to the gates of FET 1 and FET 2. As with FET 1 and FET 3, FET 4 is a P-channel field-effect transistor and will turn off upon its gate being grounded, and turn on upon application of a sufficiently high enough voltage to its gate.

During a normal state of operation, where both primary power feed 200 and secondary power feed 220 are functioning, FET 1 will be turned off, while FET 2 will be turned on. As a result of FET 2 being on, the gate of FET 3 is pulled to ground. As a result of its gate being grounded, FET 3 turns on. This consequently places the first and second set of relays in series with one another, with both sets of relays 300 and 310 deriving power from primary power feed 200. While FET 3 is on, FET 4 is turned off, thereby isolating the second set of relays 310 from the secondary power feed 220.

Upon disruption of primary power feed 200, such as a short-circuit or open-circuit condition, the voltage across resistance 600, and thus the voltages at the gates of FET 1 and FET 2, drop to ground. FET 1 subsequently turns on while FET 2 turns off. This results in the voltage of secondary power feed 220 being applied to the gate of FET 3. Consequently, FET 3 turns off, thereby isolating the second set of relays 310 from the first set of relays 300 and primary power feed 200. At the same time, the gate of FET 4 drops to ground (because primary power feed 200 became grounded), turning FET 4 on and allowing the second set of relays 310 to be powered by secondary power feed 220.

In the above embodiments, switches 330 and 332 comprised one or more field-effect transistors. According to an alternative embodiment, however, switches 330 and 332 can be comprised of junction transistors if so desired.

Based on the above discussion, the present invention is seen to disclose a vehicle power distribution and control node used to selectively energize or control one or more systems or devices in the vehicle. Unlike typical power distribution nodes, the node of the present invention permits control to be maintained over certain vehicle devices even after the disruption of the primary power feed supplying power to the node. Furthermore, unlike some forms of backup-type systems that require the use of a processor and programming code, the power distribution and control node of the present invention provides power redundancy for certain vehicle devices simply through the use of a few basic circuit components, such as diodes and transistors. While the power redundancy features of the present invention were developed with the intention of maintaining control over certain devices considered essential for the safe operation of the vehicle, the invention is not limited in that respect, instead being capable of providing power redundancy to any device, regardless of its importance in vehicle safety.

While the invention has been specifically described in connection with certain specific embodiments thereof, it is to be understood that this is by way of illustration and not of limitation, and the scope of the appended claims should be construed as broadly as the prior art will permit.

What is claimed is:

1. A power distribution node of a vehicle, comprising:
  a primary power feed supplying power to the node;
  a secondary power feed supplying power to the node;
  at least one first relay for selectively distributing power from said primary power feed to at least one first class device of the vehicle;
  at least one second relay for selectively distributing power from one of said primary power feed and secondary power feed to at least one second class device of the vehicle, said first and second class devices powered by the node; and
  a first switch selectively connecting said at least one second relay to said at least one first relay, with said at least one first relay and at least one second relay placed in series with one another, with respect to said primary power feed, when said first switch is in a closed state; and
  a second switch selectively connecting said at least one second relay to said secondary power feed;

wherein said first and second switches comprise transistors; and wherein said second switch comprises one transistor, with a gate of said transistor connected to said primary power feed, so that a voltage generated by said primary power feed controls an operating state of said transistor, said voltage applied to said gate.

2. A power distribution node of a vehicle, comprising:

a primary power feed supplying power to the node;

a secondary power feed supplying power to the node;

at least one first relay for selectively distributing power from said primary power feed to at least one first class device of the vehicle;

at least one second relay for selectively distributing power from one of said primary power feed and secondary power feed to at least one second class device of the vehicle, said first and second class devices powered by the node; and a first switch selectively connecting said at least one second relay to said at least one first relay, with said at least one first relay and at least one second relay placed in series with one another, with respect to said primary power feed, when said first switch is in a closed state; and a second switch selectively connecting said at least one second relay to said secondary power feed;

wherein said first and second switches comprise transistors; and wherein said first switch comprises first, second and third transistors, said first transistor configured to selectively connect said at least one second relay in series with said at least one first relay, and said second and third transistors configured to selectively activate said first transistor based upon a presence or absence of a disruption in said primary power feed.

3. The power distribution node of claim 2, wherein when said primary power feed is functioning normally, one of said second and third transistors is in an off-state while another of said second and third transistors is in an on-state.

* * * * *